United States Patent
Williams

[11] Patent Number: 5,950,982
[45] Date of Patent: Sep. 14, 1999

[54] FAUCET SAFETY STOP

[76] Inventor: Gloria Y. Williams, 1827 Columbus Ave., Neptune, N.J. 07753-4675

[21] Appl. No.: 09/054,239

[22] Filed: Apr. 2, 1998

[51] Int. Cl.[6] .............................. F16K 35/00; F16K 51/00
[52] U.S. Cl. .............................. 251/90; 251/95; 251/285; 251/286
[58] Field of Search .............................. 251/90, 95, 285, 251/286; 137/385

[56] References Cited

U.S. PATENT DOCUMENTS

| | | | |
|---|---|---|---|
| 48,995 | 7/1865 | Percival | 251/285 |
| 306,344 | 10/1884 | Morgan | 251/90 |
| 666,777 | 1/1901 | Pattman et al. | 251/90 |
| 912,304 | 2/1909 | Gilcher | 251/285 |
| 948,036 | 2/1910 | Best | 251/285 |
| 1,104,918 | 7/1914 | Mouat | 251/285 |
| 1,473,774 | 11/1923 | Leech | 251/90 |
| 1,650,481 | 11/1927 | Balzano | 251/90 |
| 1,673,454 | 6/1928 | Hochstein | 251/90 |
| 1,689,236 | 10/1928 | Fraser | 251/90 |
| 1,708,395 | 4/1929 | Muller | 251/90 |
| 1,823,891 | 9/1931 | Frankfort et al. | 251/90 |
| 2,530,899 | 4/1950 | Mueller | 251/90 |
| 5,219,147 | 6/1993 | Fultz et al. | 251/90 |
| 5,323,805 | 6/1994 | Scaramucci | 251/286 |

FOREIGN PATENT DOCUMENTS

| | | | |
|---|---|---|---|
| 180411 | 5/1922 | United Kingdom | 251/90 |
| 464898 | 4/1937 | United Kingdom | 251/90 |

*Primary Examiner*—George L. Walton
*Assistant Examiner*—Bryan Wallace

[57] ABSTRACT

A new FAUCET SAFETY STOP for preventing a user, especially a child, from turning a water faucet beyond a predetermined point. The inventive device includes a clip member having a pair of spaced apart arms, and a mid-portion connecting the arms together. The arms define a space therebetween adapted for receiving a portion of a base of a faucet between the arms. A stop tab is extended from the first edge of the clip member.

7 Claims, 2 Drawing Sheets

FAUCET SAFETY STOP

BACKGROUND OF THE INVENTION

1. Field of the Invention

The present invention relates to safety devices for water faucets, especially hot water faucets and more particularly pertains to a new faucet safety stop for preventing a user, especially a child, from turning a water faucet beyond a predetermined point.

2. Description of the Prior Art

The use of safety devices for water faucets, especially hot water faucets is known in the prior art. More specifically, safety devices for water faucets, especially hot water faucets heretofore devised and utilized are known to consist basically of familiar, expected and obvious structural configurations, notwithstanding the myriad of designs encompassed by the crowded prior art which have been developed for the fulfillment of countless objectives and requirements.

Known prior art safety devices for water faucets, especially hot water faucets include U.S. Pat. No. 4,353,139; U.S. Pat. No. 5,263,853; U.S. Pat. No. Des. 317,497; U.S. Pat. No. 5,152,314; U.S. Pat. No. 5,368,066; and U.S. Pat. No. 4,313,350.

While these devices fulfill their respective, particular objectives and requirements, the aforementioned patents do not disclose a new faucet safety stop. The inventive device includes a clip member having a pair of spaced apart arms, and a mid-portion connecting the arms together. The arms define a space therebetween adapted for receiving a portion of a base of a faucet between the arms. A stop tab is extended from the first edge of the clip member.

In these respects, the faucet safety stop according to the present invention substantially departs from the conventional concepts and designs of the prior art, and in so doing provides an apparatus primarily developed for the purpose of preventing a user, especially a child, from turning a water faucet beyond a predetermined point.

SUMMARY OF THE INVENTION

In view of the foregoing disadvantages inherent in the known types of safety devices for water faucets, especially hot water faucets now present in the prior art, the present invention provides a new faucet safety stop construction wherein the same can be utilized for preventing a user, especially a child, from turning a water faucet beyond a predetermined point.

The general purpose of the present invention, which will be described subsequently in greater detail, is to provide a new faucet safety stop apparatus and method which has many of the advantages of the safety devices for water faucets, especially hot water faucets mentioned heretofore and many novel features that result in a new faucet safety stop which is not anticipated, rendered obvious, suggested, or even implied by any of the prior art safety devices for water faucets, especially hot water faucets, either alone or in any combination thereof.

To attain this, the present invention generally comprises a clip member having a pair of spaced apart arms, and a mid-portion connecting the arms together. The arms define a space therebetween adapted for receiving a portion of a base of a faucet between the arms. A stop tab is extended from the first edge of the clip member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new faucet safety stop apparatus and method which has many of the advantages of the safety devices for water faucets, especially hot water faucets mentioned heretofore and many novel features that result in a new faucet safety stop which is not anticipated, rendered obvious, suggested, or even implied by any of the prior art safety devices for water faucets, especially hot water faucets, either alone or in any combination thereof.

It is another object of the present invention to provide a new faucet safety stop which may be easily and efficiently manufactured and marketed.

It is a further object of the present invention to provide a new faucet safety stop which is of a durable and reliable construction.

An even further object of the present invention is to provide a new faucet safety stop which is susceptible of a low cost of manufacture with regard to both materials and labor, and which accordingly is then susceptible of low prices of sale to the consuming public, thereby making such faucet safety stop economically available to the buying public.

Still yet another object of the present invention is to provide a new faucet safety stop which provides in the apparatuses and methods of the prior art some of the advantages thereof, while simultaneously overcoming some of the disadvantages normally associated therewith.

Still another object of the present invention is to provide a new faucet safety stop for preventing a user, especially a child, from turning a water faucet beyond a predetermined point.

Yet another object of the present invention is to provide a new faucet safety stop which includes a clip member having a pair of spaced apart arms, and a mid-portion connecting the arms together. The arms define a space therebetween adapted for receiving a portion of a base of a faucet between the arms. A stop tab is extended from the first edge of the clip member.

Still yet another object of the present invention is to provide a new faucet safety stop that may be used to prevent a user from turning a water faucet too far in one direction.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
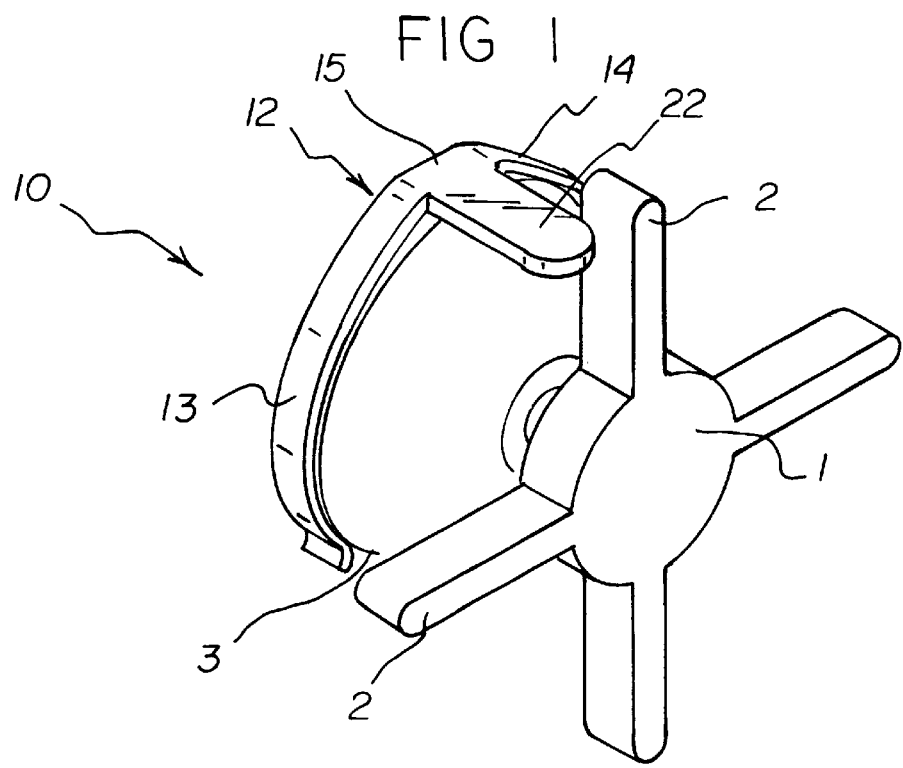
FIG. 1 is a schematic perspective view of a new faucet safety stop mounted on a faucet according to the present invention.
Figure 2:
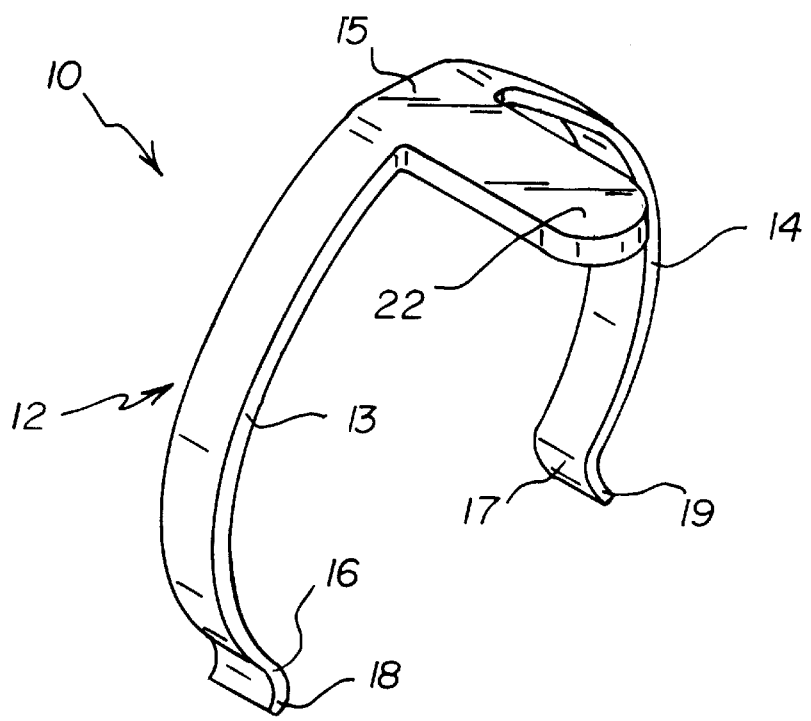
FIG. 2 is a schematic perspective view of the present invention.
Figure 3:
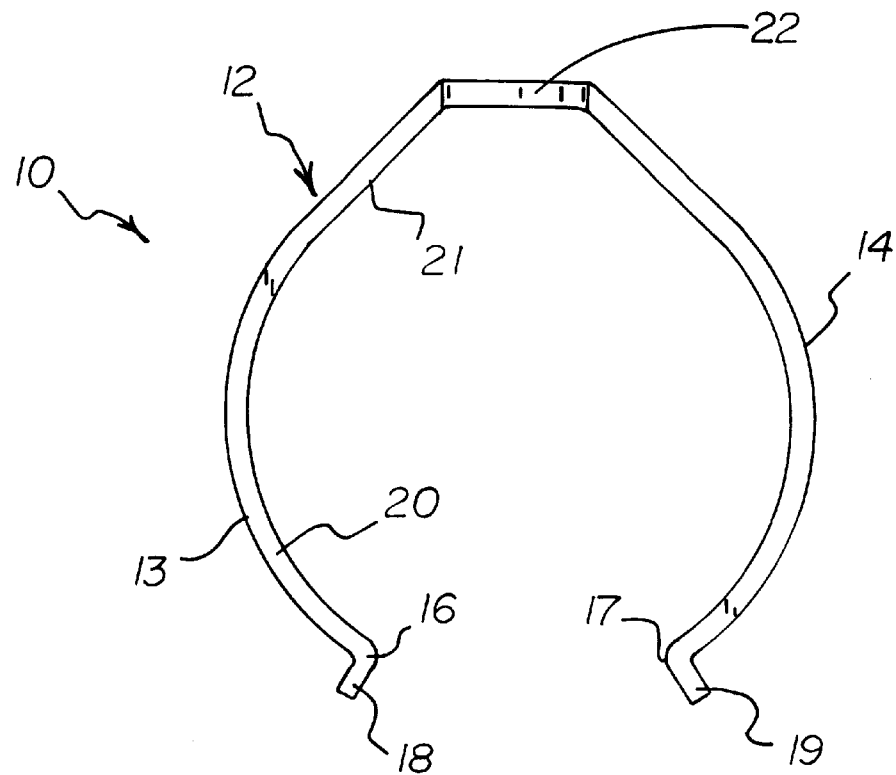
FIG. 3 is a schematic edge side view of the present invention.
Figure 4:
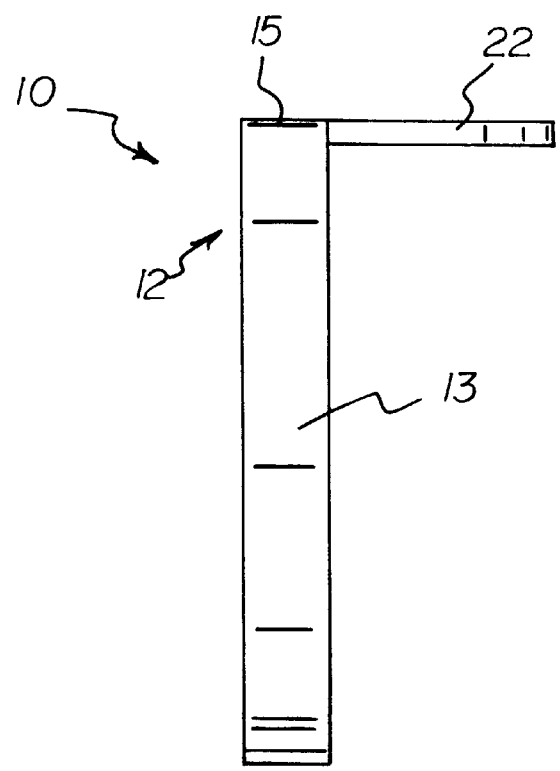
FIG. 4 is a schematic side view of the present invention.

With reference now to the drawings, and in particular to FIGS. 1 through 4 thereof, a new faucet safety stop embodying the principles and concepts of the present invention and generally designated by the reference numeral 10 will be described.

The safety stop is designed for preventing the turning of knob of a faucet, in particular a faucet having a base 3 and a knob 1 rotationally mounted to the base. Preferably, the knob has a plurality of fingers 2 extending radially outwards from it. As best illustrated in FIGS. 1 through 4, the faucet safety stop 10 generally comprises a clip member 12 having a pair of spaced apart arms 13,14, and a mid-portion 15 connecting the arms 13,14 together. The arms 13,14 define a space therebetween adapted for receiving a portion of a base 3 of a faucet between the arms 13,14. A stop tab 22 is extended from the first edge of the clip member 12.

Specifically, the clip member 12 is generally C-shaped and has first and second edges, a pair of spaced apart arms 13,14, and a mid-portion 15 connecting the arms 13,14 together. The arms 13,14 define a space therebetween adapted for receiving a portion of a base 3 of a faucet between the arms. Preferably, the clip member 12 comprises a resiliently deflectable material, such as plastic, so that the arms 13,14 hold the clip member 12 to a portion of a base 3 of a faucet received between the arms 13,14. Each of the arms 13,14 has a free end 16,17 which face each other. The free ends 16,17 of the arms 13,14 is spaced apart to define a break therebetween which provides an opening into the space between the arms 13,14 for aiding mounting of the attachment to a portion of a base 3 of a faucet. Ideally, the length of the break between the free ends 16,17 of the arms 13,14 is greater than the length of the mid-portion 15 between the arms 13,14. Preferably, Each of the arms 13,14 has an arcuate portion 20 and a generally straight portion 21. The arcuate portions 20 are located adjacent the free end of their associated arms and face each other while the generally straight portions 21 are located adjacent the mid-portion 15.

In the preferred embodiment, each of the free ends 16,17 of the arms 13,14 has a flange 18,19 which are outwardly extended away from the break between the free ends 16,17 of the arms 13,14. The flanges 18,19 are designed for aiding the mounting of the safety stop 10 around a portion of a base 3 of a faucet. Ideally, the mid-portion 15, the arms 13,14 and the flanges 18,19 lie in a common plane, that is, the portions of the clip member 12 are all coplanar.

The stop tab 22 is extended from one edge of the clip member 12. The stop tab 22 is positioned adjacent the mid-portion 15. The stop tab 22 is designed for extending between a pair of adjacent fingers 2 of a knob 1 of a faucet to prevent rotation of the knob 1 of the faucet. The stop tab 22 is preferably extended in a direction substantially perpendicular to the plane the mid-portion 15, the arms 13,14, and the flanges 18,19 lie in. Ideally, the stop tab 22 has a terminal end which is rounded. In the ideal embodiment, the thickness of the mid-portion 15 is substantially equal to the thickness of the stop tab 22.

In use, the clip member 12 is mounted to a faucet by inserting a portion of a base 3 of a faucet through the break into the space between the arms 13,14 such that the stop tab 22 is extended between a pair of adjacent fingers 2 of a knob 1 of a faucet. When the fingers 2 of the knob 1 are rotated, they eventually abut against the stop tab 22 to prevent rotation of the knob 1 of the faucet beyond a set distance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An attachment for preventing the turning of a knob of a faucet, the faucet having a base and a knob rotationally mounted to the base for controlling a valve, the knob having a plurality of fingers extending radially outwards therefrom, said attachment comprising:

a removable clip member having first and second edges, a pair of spaced apart arms, and a mid-portion connecting said arms together;

said arms defining a space therebetween, said space being adapted for removably receiving a portion of a base of a faucet therebetween to define a plurality or orientation thereon;

each of said arms having a free end, said free ends of said arms facing each other, said free ends of said arms being spaced apart to define a break therebetween;

wherein said free ends of said arms reside together in a plane in which both of said arms of said clip member reside; and a stop tab being extended from said first edge of said clip member for allowing constrained movement of the fingers of the knob within a finite range according to the plurality of orientations of the removable clip for determining a plurality of valve control positions.

2. The attachment of claim 1, wherein said clip member is generally C-shaped, and wherein each of said arms has an arcuate portion and a generally straight portion, each said arcuate portion being located adjacent said free end of its associated arm, said generally straight portions of said arms being located adjacent said mid-portion, each of said arcuate portions having a concavity, said concavities of said arcuate portions facing one another.

3. The attachment of claim 1, wherein each of said free ends of said arms having a flange, said flanges being outwardly extended away from said break defined between said free ends of said arms.

4. The attachment of claim 1, wherein said stop tab is positioned adjacent said mid-portion.

5. The attachment of claim 1, wherein said stop tab has a terminal end, wherein said terminal end of said stop tab is rounded.

6. The attachment of claim 1, wherein said mid-portion has a thickness, wherein said stop tab has a thickness, and wherein said thickness of said mid-portion is substantially equal to said thickness of said stop tab.

7. An attachment for preventing the turning of a knob of a faucet, the faucet having a base and a knob rotationally mounted to the base for a controlling valve, the knob having a plurality of fingers extending radially outwards therefrom, said attachment comprising:

a removable clip member being generally C-shaped and having first and second edges, a pair of spaced apart arms, and a mid-portion connecting said arms together;

said arms defining a space therebetween, said space being adapted for receiving a portion of a base of a faucet therebetween;

wherein said clip member comprises a resiliently deflectable plastic, wherein said arms hold said clip member to a portion of the base of the faucet received between said arms;

each of said arms having an arcuate portion and a generally straight portion, each said arcuate portion being located adjacent said free end of its associated arm, said generally straight portions of said arms being located adjacent said mid-portion, each of said arcuate portions having a concavity, said concavities of said arcuate portions facing one another;

each of said arms having a free end, said free ends of said arms facing each other, said free ends of said arms being spaced apart to define a break therebetween, said break providing an opening into said space defined between said arms removably mounting of said attachment to the portion of the base of the faucet, wherein a length of said break between said free ends of said arms is greater than a length of said mid-portion between said arms;

each of said free ends of said arms having a flange, said flanges being outwardly extended away from said break defined between said free ends of said arms, said flanges being for aiding mounting of said attachment around the portion of the base of the faucet to define a plurality of orientation thereon;

wherein said free ends of said arms reside together in a plane in which both of said arms and both of said flanges of said clip member reside;

wherein said mid-portion, said arms and said flanges lie in a common plane; and a stop tab being extended from said first edge of said clip member, said stop tab being positioned adjacent said mid-portion, said stop tab being for extending between a pair of adjacent fingers of a knob of a faucet to prevent rotation of the knob of the faucet, said stop tab being extended in a direction substantially perpendicular to the plane said mid-portion, said arms, and said flanges lie in, said stop tab having a terminal end, wherein said terminal end of said stop tab is rounded, wherein said mid-portion has a thickness, wherein said stop tab has a thickness, wherein said thickness of said mid-portion is substantially equal to said thickness of said stop tab, wherein the stop tab is adapted for allowing constrained movement of the fingers of the knob within a finite range according to the plurality of orientations of the removable clip for determining a plurality of valve control positions.

* * * * *